United States Patent [19]

Loggins

[11] Patent Number: 4,821,424

[45] Date of Patent: Apr. 18, 1989

[54] DRAFTING INSTRUMENT

[75] Inventor: C. Jim Loggins, Sheboygan, Wis.

[73] Assignee: Mayline Company, Inc., Sheboygan, Wis.

[21] Appl. No.: 226,854

[22] Filed: Aug. 1, 1988

[51] Int. Cl.[4] .................... G01B 3/00

[52] U.S. Cl. .................... 33/474; 33/484; 33/489

[58] Field of Search .................... 33/429, 479, 480, 474, 33/476, 482, 489, 484, 403

[56] References Cited

U.S. PATENT DOCUMENTS

| | | | |
|---|---|---|---|
| 343,616 | 6/1886 | Upson et al. | 33/474 |
| 699,738 | 5/1902 | Zange | 33/482 |
| 2,364,529 | 12/1944 | Hill | 33/474 |

FOREIGN PATENT DOCUMENTS

| | | | |
|---|---|---|---|
| 408703 | 9/1966 | Switzerland | 33/474 |
| 386883 | 1/1933 | United Kingdom | 33/480 |

*Primary Examiner*—Harry N. Haroian
*Attorney, Agent, or Firm*—Ronald B. Sefrna

[57] ABSTRACT

The drafting instrument of the invention generally comprises an L-shaped integrally formed substantially planar construction having one long leg and one short leg disposed perpendicular to each other. The end of each of the legs of the instrument is inclined at an angle of 45 degrees relative to the outer edge of each leg, and the lengths of the legs of the instrument are proportioned such that complimentary 60 degree and 30 degree angles are formed between the edge of the short leg and the edge of the long leg, respectively, and a straight line intersecting the end point of each leg. The instrument includes a plurality of glide points extending outwardly from each face of the instrument to support the instrument slightly above the surface upon which it is used, and further includes a handle disposed near the intersection of the two legs of the instrument to aid in reversing the instrument from face to face during use. The handle is preferably slideably disposed in an aperture and retained therein by thin end caps, allowing the handle to slide freely through the aperture in a direction perpendicular to the plane of the instrument.

16 Claims, 1 Drawing Sheet

DRAFTING INSTRUMENT

FIELD OF THE INVENTION

The present invention generally relates to the field of drafting instruments, and more particularly relates to a reversible drafting instrument primarily intended for use in conjunction with a T-square or horizontal bar, establishing limited contact between the instrument and the drafting surface, and combining the capability of establishing 30 degree, 45 degree, 60 degree, and 90 degree angles from the horizontal in a single instrument.

BACKGROUND OF THE INVENTION

The two most common operations in the practice of drafting are the scribing of horizontal and vertical lines relative to the orientation of the drafting work or drawing. Horizontal lines are generally produced with the use of a T-square or horizontal bar, and vertical lines are generally produced with the use of a right triangle in conjunction with a T-square or horizontal bar. Such triangles are also generally used to produce lines at the commonly needed angles of 30 degrees, 45 degrees, or 60 degrees from the horizontal, and are commonly available in 30–60 degree and 45 degree models. Despite their almost universal use, such triangles are subject to several disadvantages and problems, especially when used for the production of vertical lines.

The majority of those problems stem from the full contact between the extensive surface area of the face of the triangle and the drawing surface and the difficulty of grasping a triangle which is flat upon the drawing surface in order to flip it from face to face. The full contact between the face of the triangle and the drawing surface often produces smearing of both graphite or ink lines on the drawing if the triangle is slid over those lines, so it is necessary for the draftsman to position the triangle so that it is not disposed directly over at least the most recently performed work. This necessity often creates strained working positions and reduces the efficiency of the draftsman.

In addition, the use of graphite pencils and the use of erasers leaves graphite and eraser residue on the drafting surface, which accumulates along the working edge of the T-square or horizontal bar at the surface of the drawing. As a triangle is slid along that edge of the horizontal bar the edge of the triangle is in contact with the residue, increasing the drag between the contiguous edges of the two instruments and increasing the probability of creating graphite smears on the drawing surface.

Various approaches to solution of these problems have been attempted and are known in the prior art, but none of the approaches have fully addressed the combination of problems, and none have presented a coordinated solution. L-shaped drafting instruments are known in the art, as illustrated by British Pat. No. 386,883 and French Pat. No. 730,763. Those instruments are, however, primarily directed to the purpose of providing an instrument capable of creating certain specific angles or scribing lines of a certain specific length. Similarly, various triangle designs have been proposed, such as those illustrated by U.S. Pat. No. 482,023 and U.S. Pat. No. 4,545,130, for the primary purpose of providing an instrument capable of creating a multiplicity of different angles and curves.

French Pat. No. 1,385,756 discloses the use of raised points on the face of a T-square or triangle to raise the instrument above the surface of the drafting work, which alleviates certain of the normal disadvantages of the use of a triangular instrument, but the design stops short of a coordinated solution to the full scope of problems associated with a triangular instrument.

The use of a handle extending outwardly from at least one face of a drafting instrument has also been previously proposed, as in U.S. Pat. No. 831,314, U.S. Pat. No. 699,738, and U.S. Pat. No. 2,364,529. These designs are useful in providing a means of more readily grasping the drafting instrument with which they are used, but again do not address the full scope of problems.

It is an object of the present invention to provide a fully coordinated approach to solution of the problems associated with the use of a standard drafting triangle, and it is a further object of the present invention to provide a drafting instrument with a combination of features directed to performance of drafting work in a highly efficient manner.

SUMMARY OF THE INVENTION

The drafting instrument of the invention generally comprises an L-shaped integrally formed substantially planar body having one long leg and one short leg disposed in perpendicular relation to each other. In the preferred embodiment of the invention the two edges of each leg are parallel, the width of each leg is equal to the width of the other, and the lengths of the legs are proportioned such that complimentary 60 degree and 30 degree angles are formed between the longer edge of the short leg and the longer edge of the long leg, respectively, and a straight line intersecting the end points of such legs farthest from their intersection. The end of each leg is inclined relative to the longitudinal axis of such leg to form a 45 degree angle between the end of each leg and the long edge of such leg.

The body of the instrument includes a plurality of small glide points extending outwardly from each of the two planar faces of the body, for the purpose of supporting the instrument on the drafting surface and minimizing the surface area of contact between the body of the instrument and the drafting surface. The number of glide points included on each face of the preferred embodiment is selected to comprise the minimum number consistent with stability, in order to minimize the surface area of contact between the body of the instrument and the drafting surface. The glide points of the instrument serve to reduce the friction associated with sliding of the instrument on the drafting surface for the dual purpose of achieving the smoothest possible movement of the instrument and of substantially preventing smearing or other frictionally produced defacement of the drafting work. Providing glide points on both faces of the body of the instrument allows it to be readily reversible and useable from either side.

To further facilitate movement and control during use, the instrument of the invention further includes a handle extending through an aperture disposed through the body of the instrument near the intersection of the two legs of the instrument. The handle comprises a shaft extending through such aperture and pair of end caps each interconnected to a different end of the shaft. The shaft is of sufficiently smaller cross-sectional dimension than the associated aperture to allow it to slide freely through such aperture, and the end caps are of sufficiently larger dimension than the aperture to retain the shaft of the handle therein. Each end cap is thinner than the distance of extension of each of the glide points from the respective face of the body of the instrument, so that each end cap will lie within the space between the respective face of the instrument and the drafting surface and will not interfere with movement of the instrument over the drafting surface. This interactive relationship between the handle and the glide points eliminates the need to provide a recess in the body of the instrument to receive each end cap, which requires an increased body thickness, or to provide a more complex and costly bushing to retain the shaft of the handle. Any convenient configuration of the shaft and the end caps of the handle, and of its associated aperture, may be used, but use of the instrument is substantially more efficient if the cross-sectional configuration prevents rotation of the handle relative to its associated aperture.

The drafting instrument of the invention may be constructed of any suitably strong and rigid material, but use of a transparent material allows the draftsman to view the portion of the drafting work under the instrument and contributes to its efficiency of use.

Each separate structural feature of the drafting instrument of the invention provides certain distinct efficiencies in use of the instrument, and such features are complimentary in combination, creating a highly efficient instrument for the performance of drafting work. The limited surface area of the instrument in comparison with a standard triangle achieved by use of the relatively thin legs of the L-shaped configuration, along with the use of glide points to raise the instrument above the drafting surface allows a draftsman to substantially eliminate problems of smearing of ink or graphite and the build-up of graphite and eraser residue between the instrument and a horizontal bar. The parallel edges of each leg and the raising of the body of the instrument above the drafting surface allows a draftsman to scribe an ink line along any desired edge without any necessity for an undercut inking edge, eliminating the need for "cross-handed" operation, and the problem of ink being drawn between the drafting surface and the face of the instrument by capillary action. The light weight of the instrument in comparison to a standard triangle, the reduced friction afforded by the glide points, and the placement of the handle of the instrument allow a draftsman to firmly grasp and control the instrument with his hands in an optimal position for the efficient performance of drafting work and efficient movement and reversal of the instrument from face to face with minimal lost motion. While the incremental increase in efficiency of each movement may be small, over the course of preparation of a complete drafting work the aggregate increase in efficiency is substantial.

The structure of the drafting instrument of the invention will now be described in detail, with reference to the accompanying drawing figures.

DETAILED DESCRIPTION OF THE INVENTION

Figure 1:
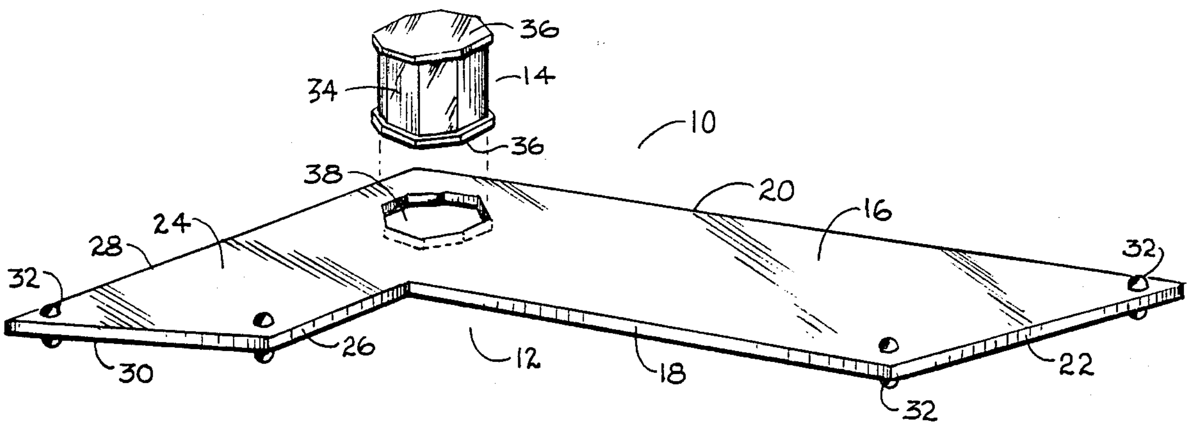
FIG. 1 is a partially exploded perspective view of the preferred embodiment of the drafting instrument of the invention.
Figure 2:
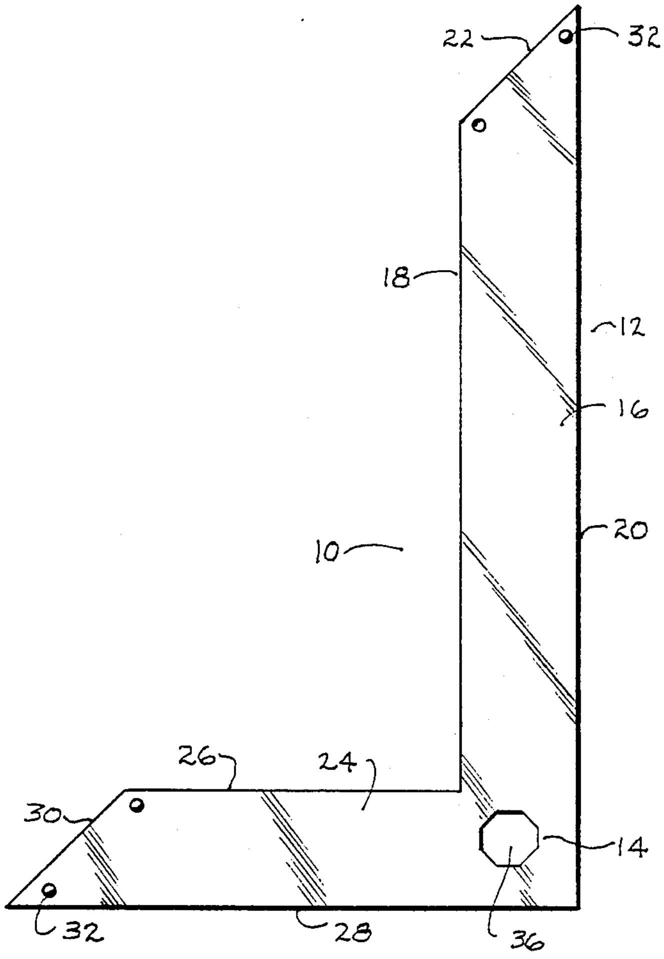
FIG. 2 is a plan view of the preferred embodiment of the drafting instrument of the invention.
Figure 3:
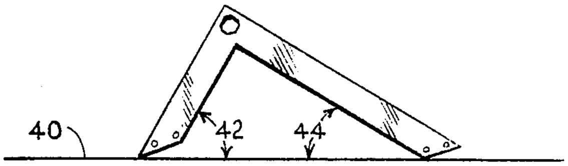
FIG. 3 is a plan view of the preferred embodiment of the drafting instrument of the invention, inverted upon a horizontal surface, such as the edge of a horizontal bar, to form complimentary 60 degree and 30 degree angles to the horizontal.

With reference to the three accompanying figures, the drafting instrument of the invention, generally designated by reference numeral 10, comprises an L-shaped substantially planar body 12, and a handle assembly 14 having a longitudinal axis perpendicular to the plane of body 12. Body 12 includes a first, long, leg 16 having an inner edge 18, an outer edge 20, and an outer end 22, and further includes a second, short, leg 24 perpendicular to long leg 16, having an inner edge 26, an outer edge 28, and an outer end 30. Outer end 22 of long leg 16 is inclined at an angle of 45 degrees relative to outer edge 20, and outer end 30 of short leg 24 is inclined at an angle of 45 degrees relative to outer edge 28. In the preferred embodiment the width of long leg 16 is equal to the width of short leg 24. The lengths of the two legs of the preferred embodiment of drafting instrument 10 are proportioned such that when instrument 10 is inverted upon a horizontal surface 40 such as a drafting horizontal bar, as illustrated in FIG. 3, a 60 degree angle 42 is formed between the edges of short leg 24 and the horizontal, and a 30 degree angle 44 is formed between the edges of long leg 16 and the horizontal. This proportional relationship may be expressed by the following formula:

$$\frac{L28 - W16}{L18 + W24} = 0.57735$$

where L28 is the length of edge 28 of short leg 24, W16 is the width of long leg 16, L18 is the length of edge 18 of long leg 16, W24 is the width of short leg 24, and the value 0.57735 is the sine of a 30 degree angle.

Body 12 of instrument 10 further includes a plurality of glide points 32 disposed on each face thereof and extending outwardly from each face a short distance, for the purpose of raising the respective face of instrument 10 above the drafting surface. In the preferred embodiment of instrument 10, each of glide points 32 is configured as a hemisphere with a radius of approximately one sixteenth inch, and is integrally formed with body 12, but any convenient configuration, size, and means of interconnection may be used within the spirit of the invention. In the preferred embodiment the total number of glide points 32 is ten, equally divided between the two faces of body 12 and disposed in paired opposing relationship as depicted in the accompanying drawing figures.

Handle assembly 14 comprises a shaft 34 and a pair of end caps 36 each interconnected to a different end of shaft 34. Shaft 34 is disposed through an aperture 38 penetrating body 12 near the intersection of long leg 16 and short leg 24, with the longitudinal axis of shaft 34 perpendicular to the plane of body 12. The cross-sectional dimension of shaft 34 is sufficiently smaller than the cross-sectional dimension of aperture 38 to allow shaft 34 to freely slide through aperture 38, and shaft 34 is of sufficient length to allow it to be comfortably grasped with the fingers. Shaft 34 is retained within aperture 38 by end caps 36, which are of larger dimension than aperture 38. The thickness of each of end caps 38 is less than the distance of extension of each of glide points 32 from the respective face of body 12, such that each end cap 36 will lie within the space between the respective face of body 12 and a plane tangent to the glide points 32 extending from such face. In the preferred embodiment of instrument 10, shaft 34 and aperture 38 are octagonal in cross-section, but any convenient configuration may be used. It is, however, preferred that shaft 34 and aperture 38 be configured and sized so as to prevent rotation of shaft 34 within aperture 38.

The foregoing detailed description of the preferred embodiment of the drafting instrument of the invention is illustrative, and not for purposes of limitation. The drafting instrument of the invention is susceptible to various modifications and alternative embodiments without departing from the scope and spirit of the invention as claimed.

What is claimed is:

1. A drafting instrument comprising an integrally formed planar body having a first, long leg and a second, short leg of equal widths, said legs intersecting at their proximal ends at a right angle and each having an inner edge and an outer edge, with the distal end of each leg inclined at a 45 degree angle relative to the outer edge of such leg, and with the lengths of said first and second legs proportioned such that a 30 degree angle is formed between the inner edge of said first, long leg and a straight line mutually tangent to the distal ends of both said first and second legs and a 60 degree angle is formed between the outer edge of said second, short leg and a straight line mutually tangent to the distal ends of both said first and second legs;

a plurality of glide points extending outwardly from each planar face of said planar body a short distance so as to contact a planar surface upon which the drafting instrument is positioned with the planar body of the drafting instrument parallel to said planar surface, and suspend said planar body above said planar surface;

an aperture penetrating said planar body near the intersection of said first leg and said second leg of said body; and a handle having a shaft to be received through said aperture and having a pair of end caps each interconnected to a different end of said shaft, each of said end caps having a thickness less than the distance of extension of each of said glide points from each face of said planar body.

2. The drafting instrument of claim 1, wherein said body is constructed of a transparent material.

3. The drafting instrument of claim 1, wherein the relationship between the length of the long edges of said first and second legs of said body and the width of each of said legs is expressed by the formula (Lso−W)/(-Lfi+W)=sin 30 degrees, where Lso is the length of the outer edge of said second, short leg, Lfi is the length of the inner edge of said first, long leg, and W is the width of each of said legs.

4. The drafting instrument of claim 1, wherein the number of said glide points extending from each face of said body is equal to the number of said glide points extending from the opposite face.

5. The drafting instrument of claim 1, wherein said shaft of said handle extends through said aperture in sliding relationship therewith along the longitudinal axis of said shaft, and the cross-sectional configurations of said aperture and of said shaft are such as to prevent rotation of said shaft relative to said aperture.

6. A reversible drafting instrument useful for the scribing of lines on a substantially planar surface with such lines at respective angles of 0 degrees, 30 degrees, 60 degrees, 45 degrees, and 90 degrees relative to a base line on such substantially planar surface, comprising:

an L-shaped planar body having a first, long leg and a second, short leg disposed at a 90 degree angle to each other, each leg having inner and outer edges mutually parallel to the longitudinal axis of such leg, each leg having an outer end inclined at an angle of 45 degrees relative to the outer edge of such leg, with the relative lengths of said legs determined in accordance with the formula (Lso−Wf)/(Lfi+Ws)=sin 30 degrees, where Lso is the length of the outer edge of said second, short leg, Wf is the width of said first, long leg, Lfi is the length of the inner edge of said first, long leg, and Ws is the width of said second, short leg;

a plurality of glide points interconnected to and extending outwardly a short equal distance from each face of said planar body for the purpose of supporting said planar body in stable parallel relationship with and a short distance above a planar surface upon which said said planar body is placed;

a non-circular aperture penetrating said planar body with said aperture centered on the line extending from the intersection of the inner edges of said first leg and said second leg to the intersection of the outer edges of said first leg and said second leg of said planar body; and a reversible handle assembly having a shaft to be received through said aperture, with the cross-sectional configuration and cross-sectional dimensions of said shaft adapted to prevent rotation of said shaft relative to said aperture and with the length of said shaft greater than the thickness of said planar body, and having a pair of end caps each interconnected to a different end of said shaft, with the thickness of each of said end caps being less than the distance of extension of each of said glide points from the respective face of said planar body.

7. The reversible drafting instrument of claim 6, wherein said planar body is constructed of a transparent plastic material.

8. The reversible drafting instrument of claim 6, wherein the width of said first leg of said planar body is equal to the width of said second leg of said planar body.

9. The reversible drafting instrument of claim 6, wherein the edge surface of said planar body is perpendicular to the plane of said planar body.

10. The reversible drafting instrument of claim 6, wherein the distance of extension of each of said glide points from the respective face of said planar body is less than or equal to the thickness of said planar body.

11. The reversible drafting instrument of claim 6, wherein the total number of said glide points is an even number and said glide points are evenly divided between the faces of said planar body and are disposed in opposed paired relationship across the plane of said planar body.

12. The reversible drafting instrument of claim 6, wherein the total number of said glide points is ten, the number of said glide points interconnected to each face of said planar body is five, and said glide points are disposed in opposed paired relationship across the plane of said planar body with one such opposed pair disposed near the intersection of each edge of each of said first and second legs with the respective end of each of said legs, and the final such opposed pair disposed near the intersection of the outer edge of said first leg with the outer edge of said second leg.

13. In an L-shaped substantially planar drafting instrument having first and second faces and including a first, long leg of greater length than width and of equal width throughout its length and a second, short leg of greater length than width and of equal width throughout its length, with the first leg and the second leg disposed at a right angle to each other and fixedly interconnected whereby each leg has an inner edge and an outer edge, the improvement comprising the end of each leg opposite the interconnection between the first leg and the second leg inclined at an angle of 45 degrees relative to the outer edge of such leg;

the length of said first leg and the length of said second leg proportioned such that an angle of 30 degrees is formed between the inner edge of said first leg and a straight line tangent to the end of said first leg and to the end of said second leg, and an angle of 60 degrees is formed between the outer edge of said second leg and said straight line tangent to the end of said first leg and to the end of said second leg;

a plurality of glide points divided between the first face and the second face of the drafting instrument and interconnected thereto such that each of said glide points extends a short distance from the respective face of the drafting instrument, with respective glide points disposed on each face so as to provide a stable suspension of the drafting instrument above a substantially planar surface upon which the drafting instrument is placed with the plane of the drafting instrument parallel to the plane of said surface; and a reversible handle assembly including a handle aperture penetrating the drafting instrument near the intersection of said first and second legs with the axis of said aperture perpendicular to the plane of the drafting instrument, a handle shaft having two ends and being substantially greater in length than the thickness of the drafting instrument between its first and second faces, said handle shaft extending through said aperture in sliding relation therewith along the longitudinal axis of said handle shaft, and a pair of thin substantially planar end caps each interconnected to a different end of said handle shaft with the plane of each of said end caps perpendicular to the longitudinal axis of said handle shaft, with the thickness of each said end cap perpendicular to the plane thereof less than the distance of extension of each of said glide points from the respective face of the drafting instrument and with the with of each said end cap in the plane thereof greater than the width of said handle aperture whereby said end caps retain said handle shaft within said aperture.

14. The L-shaped substantially planar drafting instrument of claim 13, wherein the fixedly interconnected first and second legs form the body of the drafting instrument and said body is formed as a one piece construction of a substantially transparent plastic material.

15. The L-shaped substantially planar drafting instrument of claim 13, wherein the total number of said glide points is ten, the number of said glide points interconnected to each face of the drafting instrument is five, and the glide points on each face are disposed in paired opposed relationship with the glide points on the opposite face.

16. The L-shaped substantially planar drafting instrument of claim 13, wherein said handle aperture is noncircular in configuration and the cross-sectional configuration and cross-sectional dimensions of said handle shaft are adapted such that said handle shaft is prevented from rotating about its longitudinal axis relative to said handle aperture while allowed to slide along its longitudinal axis relative to said handle aperture.

* * * * *